G. W. WOLCOTT.
COMBINATION LEVEL AND SQUARE.
APPLICATION FILED MAR. 2, 1910.
974,007.
Patented Oct. 25, 1910.
2 SHEETS—SHEET 1.
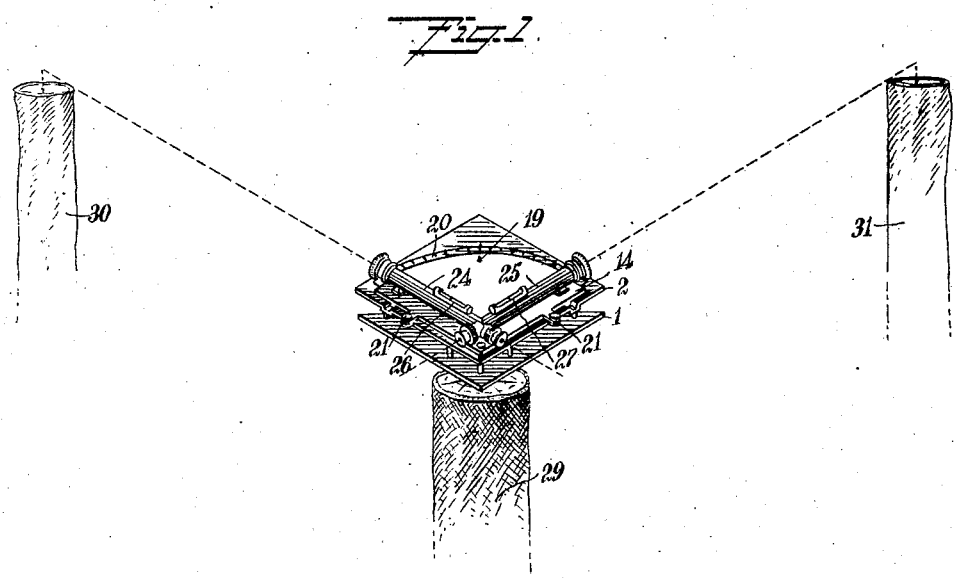
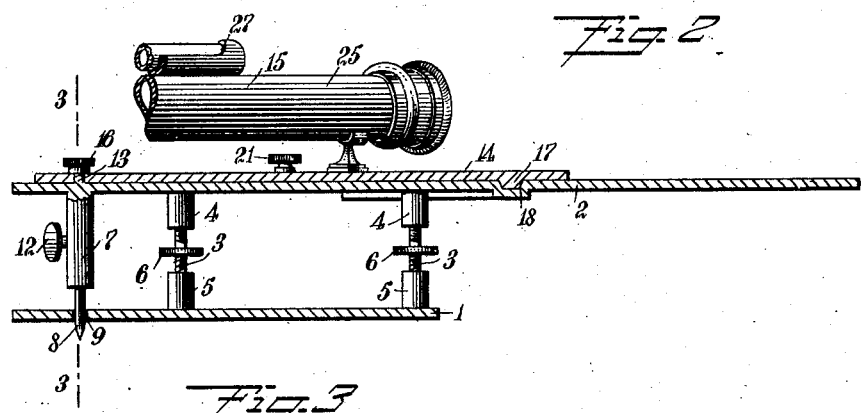
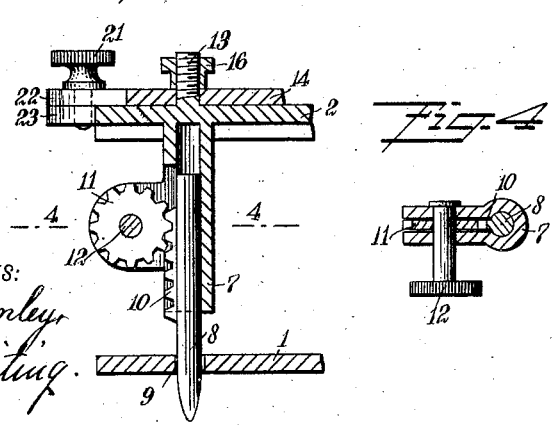
WITNESSES:
E. G. Bromley
H. Whiting
INVENTOR
Guy Walter Wolcott
BY Munn & Co.
ATTORNEYS

G. W. WOLCOTT.
COMBINATION LEVEL AND SQUARE.
APPLICATION FILED MAR. 2, 1910.

974,007.

Patented Oct. 25, 1910.
2 SHEETS—SHEET 2.

WITNESSES:
E. G. Bromley.
R. H. Whiting.

INVENTOR
Guy Walter Wolcott
BY Munn & Co.
ATTORNEYS

UNITED STATES PATENT OFFICE.

GUY WALTER WOLCOTT, OF HEALDSBURG, CALIFORNIA.

COMBINATION LEVEL AND SQUARE.

974,007.   Specification of Letters Patent.   Patented Oct. 25, 1910.

Application filed March 2, 1910. Serial No. 546,779.

*To all whom it may concern:*

Be it known that I, GUY WALTER WOL-COTT, a citizen of the United States, and a resident of Healdsburg, in the county of Sonoma and State of California, have invented a new and Improved Combination Level and Square, of which the following is a full, clear, and exact description.

This invention relates to a new and improved instrument for squaring and leveling the foundations for buildings and giving the grade line at the same time, and also for setting out orchard trees and vines and lining them in a perfect rectangle, and for any other operation where it is desired to obtain the accurate alinement point, to form a perfect rectangle at a proper level.

An object of this invention is to provide a device which will be simple in construction, inexpensive to manufacture, strong, durable, simple and accurate in its operation, and capable of perfect adjustment.

A further object of this invention is to provide a squaring and leveling instrument wherein a plurality of sight tubes are provided, secured at a definite angle one to the other, whereby great accuracy may be obtained, even by an uneducated operator.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 5:
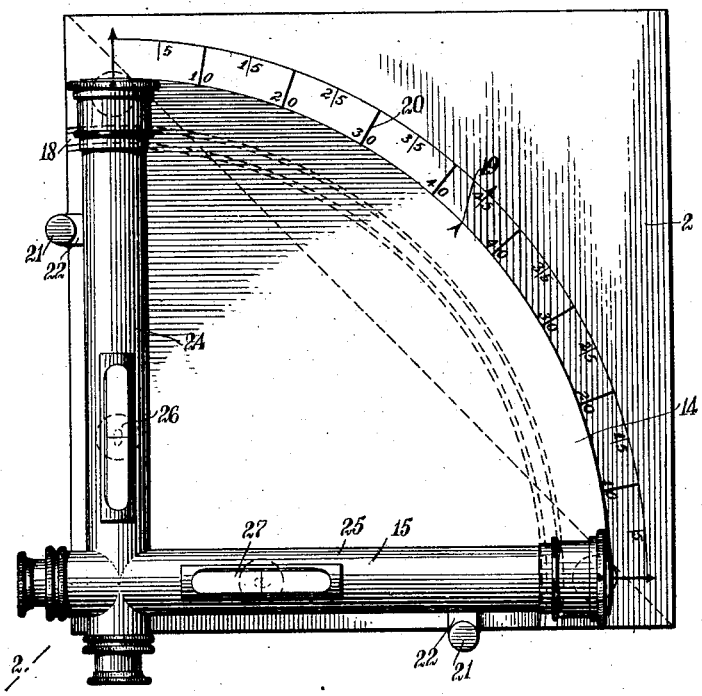
Figure 6:
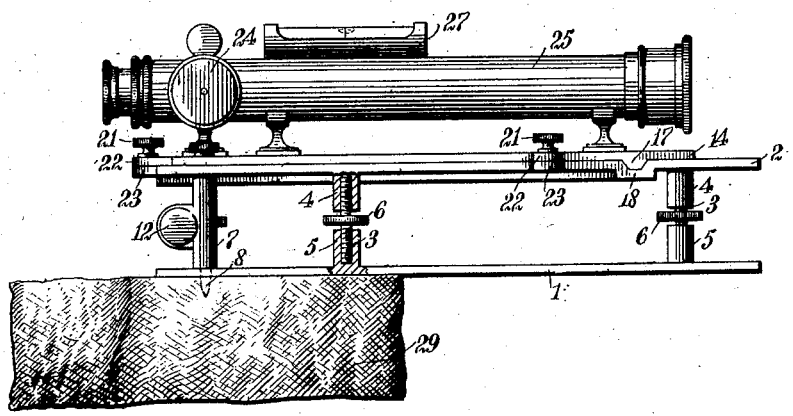

Figure 1 is a perspective view showing my device in use; Fig. 2 is a fragmentary sectional view in elevation, on the line 2—2 of Fig. 5; Fig. 3 is a vertical section on the line 3—3 of Fig. 2; Fig. 4 is a horizontal section on the line 4—4 of Fig. 3; Fig. 5 is a top plan view; and Fig. 6 is a side view in elevation.

Referring more particularly to the separate parts of the device, 1 indicates a base, made of any suitable form and material. Secured to the base 1, there is provided a table 2. The means of securing the table 2 to the base 1, while it may consist of any suitable adjustable means, is composed of a plurality of doubly-threaded adjusting screws 3, extending at their opposite ends in screw-threaded lugs 4 and 5 on the table 2 and the base 1, respectively. The adjusting screws 3 are provided intermediate their ends with suitable finger-holds 6, whereby they may be readily adjusted. The table 2 is provided with a suitable downwardly-extending tube 7, which forms a slideway guide for a pin 8, which is sharpened at its lower end, whereby it may extend through an opening 9 in the base 1 and engage any support, for the purpose of fixedly locating the instrument on the proper point. The pin 8 may be adjustable relative to the table 2 in any suitable manner, such as by providing a rack 10 on the side thereof, which is engaged by a pinion 11 secured to and operated by a member 12. It will thus be seen that by rotating the member 12 in a clockwise direction the pin 8 can be forced into a support when it is desired to locate the instrument definitely; and further, that the pin 8 can be removed readily when it is desired to shift the instrument from the previously-mentioned position. Inasmuch as the pin 8 is made quite sharp, the weight of the instrument is generally sufficient to offer the necessary resistance in forcing the pin into the support. If the support is excessively hard, additional resistance can be obtained by pressing the hand downwardly on the instrument.

Extending upwardly from the table 2 and in alinement with the pin 8 so that its center overlies the center of the pin 8, there is provided a pivot pin 13. Adjustably mounted on the table 2 by having an opening therein engaging the pin 13, there is provided a frame 14, which forms a support for a sight member 15 of the instrument. The frame 14 is prevented from accidental removal from the table 2 by means of a thumb-screw 16, which engages a screw-thread on the pin 13. The supporting frame 14 is provided with a suitable guide 17, preferably circular in form, struck from the center of the pin 13 as a center, which engages a corresponding groove 18 in the table 2, to adjust the sight member 15 to any position relative to the table 2 and the support on which it is located. The frame 14 has a circular edge, and is provided with an indicating mark 19, which is adapted to cooperate with an arcuate scale 20 inscribed in any suitable manner on the table 2, so as to indicate the variation from the normal position of the frame 14 relative to the table 2. When it is not desired to use the pivotal relation of the frame 14 with respect to the table 2, this frame can be locked to the table by means of one or more locking members 21, which are in the form of screws or pins engaging in openings in flanges 22 and 23 on the frame 14 and the table 2, which are adapted to be brought into alinement.

The sight member 15 is of rather peculiar form, in that it consists of a plurality of sight tubes 24 and 25 secured to each other at a predetermined angle and having their lines of sight crossing each other at a point whose projection corresponds with the projection of the centers of the pins 13 and 8. As shown in the figures, these tubes are preferably extended at right-angles to each other, so that the lines of sight therethrough extend at right-angles to each other, enabling the instrument to be used without moving, to locate two points whose lines of sight with a given point are at right-angles to each other. The tubes 24 and 25 are provided with level-indicating devices 26 and 27 of any suitable character. The sight tubes 24 and 25 may be of any character suitable to get a line on an object or point, and may have the usual adjustments of the eye-pieces and the objectives to give the proper focus.

The operation of the device will be readily understood when taken in connection with the above description.

In using the device for locating the foundation of a rectangular building, the instrument is set on a suitable post or stake, indicated by the numeral 29 in Fig. 1, and the pin 8 forced down into the known point located on the post 29. The instrument is then leveled up by manipulating the screws 3 until the leveling devices 26 and 27 indicate that the instrument is in true level. Sights are then taken through the tubes 24 and 25 in the direction of the two juxtaposed corners of the foundation, which are represented in Fig. 1 by the posts 30 and 31. After allowing for the difference of the tubes 24, 25 above the point located on the top of the post 29, the exact level and direction of the point on the posts 30 and 31 can be determined. The instrument is then shifted to either of the posts 30 or 31, and a back sight taken at the point on the post 29, and the direction of the remaining corner of the foundation determined by taking a sight in its direction through the other sight tube of the instruments. The exact position of this fourth corner can then be located by taking sights from the other of the positions 30 and 31. Many other uses of the device might be described, but it is believed this illustration is sufficient.

While I have shown one embodiment of my invention, I do not wish to be limited to the specific details thereof, but desire to be protected in various changes, modifications and alterations which I may make within the scope of the appended claims.

Having thus described my invention, I claim as new and desire to secure by Letters Patent:—

1. The combination with a plurality of sight tubes extending in fixed relation with respect to each other and having their lines of sight intersecting, of a pin connected to said sight tubes having its point exposed and projecting downwardly and corresponding to the projection of the point of intersection of the lines of sight of said sight tubes and adapted to be inserted in an extraneous support to locate the position of said sight tubes.

2. The combination with a plurality of sight tubes extending in fixed relation with respect to each other and having their lines of sight intersecting, of a pin connected to said sight tubes and having an exposed point projecting downwardly and corresponding to the projection of the point of intersection of the lines of sight of said sight tubes and adapted to be inserted in an extraneous support to locate the position of said sight tubes, and means for pivotally connecting said sight tubes to said pin.

3. The combination with a table, of a frame pivotally connected to said table, a plurality of sight tubes connected to said frame and secured to each other in a given fixed relation, and means for indicating the relative movement of said sight tubes with respect to said table.

4. The combination with a table, of a frame pivotally connected to said table, a plurality of sight tubes connected to said frame and secured to each other in a given fixed relation, means for indicating the relative movement of said sight tubes with respect to said table, and means for adjusting the level of said table.

5. The combination with a base, of a table, means for adjustably securing said table to said base, a frame adjustably secured to said table, a plurality of sight tubes secured to each other in a given fixed relation, and a pin adjustably connected to said table and adapted to locate the position of said sight tubes.

6. The combination with a pair of sight tubes secured at right-angles to each other so that their lines of sight intersect each other at right-angles, a pin connected to said sight tubes, the point of which forms the projection of the point of intersection of said lines of sight, means for adjusting the vertical position of said sight tubes, means for indicating the level of said sight tubes, means for adjusting said sight tubes horizontally, and means for indicating the horizontal adjustment of said sight tubes.

7. The combination with a pair of sight tubes secured at right-angles to each other so that their lines of sight intersect each other at right-angles, a pin connected to said sight tubes, the point of which forms the projection of the point of intersection of said lines of sight, means for adjusting the vertical position of said sight tubes, means for indicating the level of said sight tubes, means for adjusting said sight tubes horizontally, means for indicating the horizontal adjustment of said sight tubes, and means for locking said sight tubes against horizontal adjustment.

8. The combination with a pair of sight tubes secured together in a permanent fixed relation, of a common supporting member for said sight tubes, a level on each of said sight tubes, and means for adjusting the level of said member.

9. The combination with a base, of a table adjustably secured to said base, said table having an arcuate groove therein, a frame pivotally connected to said table and having an arcuate tongue engaging said arcuate groove on said table, means on said table for indicating the movement of said frame relative to said table, and a pair of sight tubes secured together in fixed relation and connected to said frame.

In testimony whereof I have signed my name to this specification in the presence of two subscribing witnesses.

GUY WALTER WOLCOTT.

Witnesses:
  R. E. BAER,
  S. HILGERLOH.